United States Patent [19]

Baumann et al.

[11] Patent Number: 4,836,929
[45] Date of Patent: Jun. 6, 1989

[54] PROCESS FOR BREAKING DOWN ORGANIC SUBSTANCES AND/OR MICROBES IN PRETREATED FEED WATER FOR HIGH-PURITY WATER RECIRCULATION SYSTEMS

[75] Inventors: Hans Baumann, Staretschwil; Samuel Stucki, Nussbaumen, both of Switzerland

[73] Assignee: BBC Brown Boveri AG, Baden, Switzerland

[21] Appl. No.: 165,902

[22] Filed: Mar. 9, 1988

[30] Foreign Application Priority Data

Mar. 11, 1987 [CH] Switzerland ............................ 917/87

[51] Int. Cl.$^4$ .............................................. C02F 1/46
[52] U.S. Cl. ..................................... 210/638; 210/669; 210/748; 210/760; 210/764; 204/129
[58] Field of Search ................ 204/128, 129, 149–152; 210/669, 748, 760, 764, 638, 639, 765, 908–910

[56] References Cited

U.S. PATENT DOCUMENTS

| | | | |
|---|---|---|---|
| 3,822,786 | 7/1974 | Morschall | 210/108 |
| 3,925,176 | 12/1975 | Okert | 210/764 X |
| 4,179,347 | 12/1979 | Krause et al. | 210/764 |
| 4,218,315 | 8/1980 | Hortkorn | 210/748 X |
| 4,311,569 | 1/1982 | Dempsey et al. | 204/129 |
| 4,416,747 | 11/1983 | Menth et al. | 204/129 |
| 4,548,716 | 10/1985 | Boeve | 210/669 X |
| 4,735,728 | 4/1988 | Wemhoff | 210/669 X |

FOREIGN PATENT DOCUMENTS

| | | |
|---|---|---|
| 242533 | 10/1987 | European Pat. Off. . |
| 3243817 | 7/1984 | Fed. Rep. of Germany . |
| 61-85386 | 8/1986 | Japan . |
| 2136790 | 9/1984 | United Kingdom . |

OTHER PUBLICATIONS

Nebel et al., "Purification of Deionized Water by Oxidation with Ozone," *Solid State Technology*, vol. 27, No. 10, Oct., 1984, pp. 185–193.

*Primary Examiner*—Tom Wyse
*Attorney, Agent, or Firm*—Oblon, Spivak, McClelland, Maier, & Neustadt

[57] ABSTRACT

A process for breaking down organic substances and/or microbes in pretreated feed water for high-purity recirculation systems using ozone which is generated in the anode space (5) of an electrochemical cell (3) and treated with ultraviolet rays and/or with $H_2$ (8) generated in the cathode space (6) of the same cell (3) or $H_2$ (20) supplied from outside. The latter is used to reduce elementary oxygen in any form to harmless water. Post treatment via mixed bed (14) and filter (15). Possibility of feeding back water (19) downstream of the receiver (17). No harmful reaction products.

14 Claims, 1 Drawing Sheet

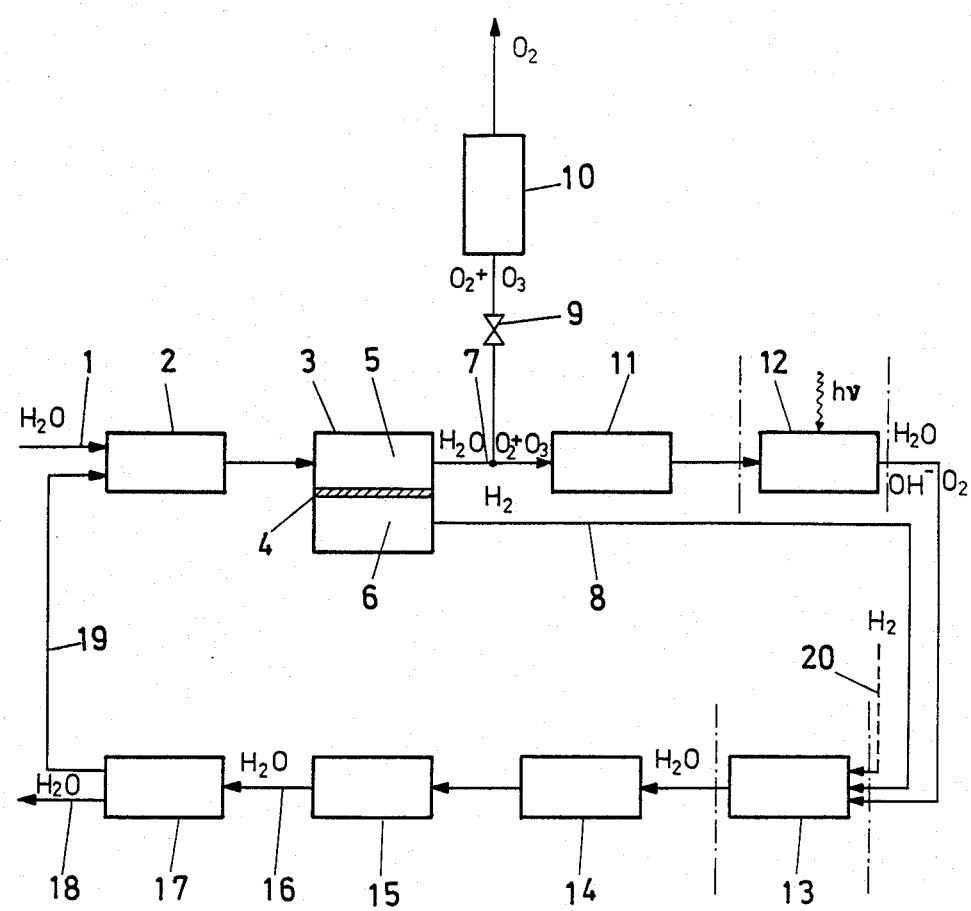

PROCESS FOR BREAKING DOWN ORGANIC SUBSTANCES AND/OR MICROBES IN PRETREATED FEED WATER FOR HIGH-PURITY WATER RECIRCULATION SYSTEMS

FIELD OF THE INVENTION

Water treatment for special plants in which extreme conditions relating to purity in chemical, physical and biological terms have to be fulfilled.

The invention relates to the provision of extremely pure water, predominantly for rinsing purposes in the manufacture of semiconductor components for the electronics industry. The feed water to be provided for such purposes imposes maximum requirements on purity, freedom from organic constituents, microbes, salts and gases. Equipment for desalination, softening, filtration, degasification, removal of organic constituents, sterilization and disinfection is therefore necessary.

In particular it relates to a process for breaking down organic substances and/or microbes in pretreated feed water for high-purity water recirculation systems using ozone which is generated in the anode space of an electrochemical cell provided with a solid electrolyte and which is brought into contact with the substances and/or microbes contained in the feed water, with a particular residence time being maintained.

DISCUSSION OF BACKGROUND

In addition to the classical filtration and softening, treatment with ozone or irradiation in the ultraviolet region plays an important part in water treatment. In connection with the manufacture of highly integrated cirucits in the electronics industry, the requirements imposed on rinsing water have been increased again. The permissible values for microbe counts and residual oxygen contents have been reduced further. The state of the art of high-purity water recirculation systems, including pretreatment of the water, has been described in numerous references (cf. R.A. Hango, "Deionized Water System", Solid State Technology, 1983, July, pages 107–111).

The ultraviolet radiators usually employed for sterilization are effective only in the path of the rays from the lamp and do not therefore represent an absolutely reliable protection. Although ozone treatment would eradicate this disadvantage, it introduces undesirable oxygen into the circulation system. The synergetic action of ozone and ultraviolet irradiation has been described (of., for example, R. Barker and F.M. Taylor "Oxydation of 2-propanol in Dilute Aqueous Solution by UV-/Ozone", Poceedings of the Int. Conf., - The Role of Ozone and Waste-water Treatment, London, 13–14th November 1985).

It is known that oxygen is reduced by hydrogen at room temperature in the presence of catalysts (palladium), water being formed (cf. inter alia, F. Martinola, S. Oeckl and P. Thomas, "Catalytic Reduction of Oxygen in Water", Vom Wasser 65, 1985, pages 163–72, Translation).

Electrochemical cells containing a solid electrolyte in the form of a membrane composed of a plastic polymer (ion exchange) and suitable processes for producing gaseous products have been described in numerous references. Such cells may advantageously be used to produce ozone (cf., for example, U.S. Pat. No. A 4,416,747; EP-B-0,068,522; H.P. Klein and S. Stucki, The Production of Ozone by Electrolysis and its Application in high purity Water Systems, Conference Proceedings, 7th Ozone World Congress, pages 110–115, 9th–12th September 1985, Tokyo).

The processes and equipment described above in general no longer meet the constantly increasing requirements for high-purity water circulation systems. There is therefore a need to refine the processes and develop them further.

SUMMARY OF THE INVENTION

Accordingly, one object of this invention is to provide a process for breaking down organic substances or microbes, or both, in the feed water of high-purity water recirculation systems, which process meets the increased requirements imposed on rinsing water in the manufacture of electronic components in relation to freedom from organic constituents, microbes, oxygen in any form and any harmful reaction products. The process should be simple, reliable in operation and inexpensive and should be notable for reproducible results.

This object is achieved by the process mentioned in the introduction which comprises exposing the feed water additionally to an ultraviolet irradiation after the residence time has elapsed.

Furthermore, this object is achieved by the process mention in the introduction wherein the feed water is mixed additionally with a part of the hydrogen generated in the cathode space of the electrochemical cell after the residence time has elapsed, the residual oxygen left in the feed water and the residual ozone being reacted with the hydrogen in a manner such that said components are completely broken down to form water.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing.

DESCRIPTION OF THE PREFERRED EMBODIMENTS

Referring now to the drawing, the figure shows a diagrammatic flow chart of the process. One is the feed water supply (untreated water), which is indicated by an arrow, to the pretreatment equipment 2 (feedwater treatment). Depending on the requirement, this may comprise one or more filters, water softening apparatuses, desalination and reverse osmosis, ion exchangers etc. and any combination of such equipment.

From here, the water is fed to an electrochemical cell 3 which is provided with a solid electrolyte 4 in the form of a membrane composed of a plastic polymer. In the anode space 5, oxygen and ozone are liberated and in the cathode 6 - hydrogen. The anodically generated $O_2$ and $O_3$, which leaves the anode space 5 with the $H_2O$, is designated with the reference symbol 7, and the cathodically produced $H_2$, which is drawn off from the cathode space 6, is designated with the reference symbol 8. 9 is a valve for venting $O_2$ and $O_3$ if applicable, and 10 is equipment connected thereto for converting $O_3$ into $O_2$. The water is now fed into the residence time container 11 in which, for example, organic substances and/or microorganisms are subjected to exposure to $O_2$ and $O_3$ and are broken down. This is followed by the reaction vessel 12 for ultraviolet irradiation (indicated by undulated arrow h v) in which OH radicals are produced by reaction of $H_2O$ with $O_3$, the excess $O_3$ is reduced to $O_2$ and microbes are destroyed. The water is now fed into the reaction vessel 13 in which the $O_2$ and $O_3$ is broken down at room temperature by means of adding $H_2$ while exposing to a catalyst (for example palladium). The $H_2$ may preferably be drawn from the cathode space 6 of the electrochemical cell 3 (reference symbol 8). Optionally, extraneous hydrogen may be supplied in accordance with the broken line and reference symbol 20. 14 is a mixed bed (ion exchanger) which retains a part of the reaction products. The remainder of the latter is retained in the filter 15. 15 may comprise an ultrafiltration stage and/or a reverse osmosis stage. The arrow 16 represents the final water provided (high-purity water) which is now fed to the receiver 17. 18 is the waste water drain tapped off from the receiver 17. A part of the used water is returned to the pretreatment equipment 2 via a water return line 19.

The apparatuses 12 and 13 are placed between broken lines since they may be used optionally individually or in combination, i.e. 12 or 13 may also each be omitted.

EXEMPLARY EMBODIMENT 1

The process according to variant A was carried out in a pilot plant in which the reaction vessel 13 containing catalyst for breaking down $O_2$ and $O_3$ was absent. Accordingly, no cathodically generated $H_2$ (8) or extraneous hydrogen (20) was supplied in this case.

The pretreatment equipment 2 comprised an apparatus for reverse osmosis, a mixed bed with cation -anion exchanger and a filter. The untreated water 1 fed in was softened beforehand and fully desalinated. The electrochemical cell 3 containing solid electrolyte 4 (plastic polymer having the trade name ("Nafion" supplied by Du Pont) has an electrode area of 3 $cm^2$. It was supplied with a quantity of water of 100 l/h and operated with a current of 4A (current density 1.33 $A/cm^3$) with the application of a total voltage of 3.95 V. Under these conditions, an $O_2$ concentration of 9.4 mg/l and an $O_3$ concentration of 2.2 mg/l were established in the previously degasified water. The residence time container 11 had a capacity of 1,300 ml. This resulted in a residence time of 47 s. The reaction vessel 12 for UV irradiation comprised a quartz glass container with a capacity of 1,320 ml, which was provided with a mercury vapour low-pressure radiator TNN 15/32 manufactured by Heraeus (Germany). The water was then fed into the mixed bed (ion exchanger) 14, which had a capacity of 1,950 ml (Ultrapure Type supplied by Sybron Barnstead). The final water purifying equipment provided was a filter 15. In the present case, this was a candle filter of the type PFT-08-10-UN-15 manufactured by Brunswick with a retention capability of 0.8 μm. The plant was operated in a manner such that no water return 19 took place. 100% of the water, which was saturated with air, and consequently also with oxygen, was fed via the feed water supply 1 to the pretreatment equipment 2. For this reason, the $O_3$ concentration downstream of the electrochemical cell was only 1.6 mg/l, while the $O_2$ concentation adjusted itself to approx. 10 mg/l. Downstream of the reaction vessel 12 for ultraviolet irradiation, the $O_3$ concentration was still 0.02 mg/l. By way of experiment, 2 ppm of 2-propanol were added to the feed water in order to investigate the breaking down of total organic carbon.

EXEMPLARY EMBODIMENT 2

The process according to variant B was carried out in a larger plant which contained all the equipment designated in the figure, including reaction vessel 13 containing catalyst for breakign down $O_2$ and $O_3$. Accordingly, $H_2$ (8) generated cathodically in the electrochemical cell 3 was supplied to the reaction vessel 13.

The plant was dimensioned for a water flow rate of 10 $m^3$/h, referred to the electrochemical cell 3. The latter had an electrode area of 4 $dm^2$ and was operated with a current level of 400 A, which corresponded to a current density of 1 $A/cm^2$. The cell voltage was 3.8 V. The residence time container 11 had a capacity of 150 l, so that the average residence time was approx. 54 s. The reaction vessel 12 for ultraviolet irradiation, which was provided with 5 mercury-vapour low-pressure high-current lamps, had a capacity of 160 l. The reaction vessel 13 containing a noble metal catalyst had a content of 160 l and comprised a bed of plastic carriers which were coated with palladium. In the present case, this was a product having the trade name "Lewatit OC1045" manufactured by Bayer, Germany. The mixed bed 14 containing ion exchangers had a capacity of 200 l. After it had passed through the filter 15, the high-purity water 16 was supplied to the receiver 17, a manufacturing plant for semiconductor chips. The plant was operated in a manner such that 90% of the water flowing through the electrochemical cell 3 was fed back via the water return line 19 to the pretreatment equipment 2, while 10% was fed into the circulation system as untreated water via the feed water supply 1.

The gas balance of the plant was as follows:

| At the output of the equipment | Concentration (mg/l) | | |
|---|---|---|---|
| | $O_3$ | $O_2$ | $H_2$ |
| Cell (3) | 2.15 | 9.65 | 0 |
| UV reaction vessel (12) | 0.01 | 10.5 | 1.31 |
| Cathodic reaction vessel (13) | 0 | 0.02 | 0 |

EXEMPLARY EMBODIMENT 3

The process according to variant C was carried out in a smaller plant in which no reaction vessel 12 for ultraviolet irradiation was present. The water was essentially treated with ozone, the excess of elementary oxygen carriers being broken down by reduction with cathodically generated $H_2$.

The plant was dimensioned for a water flow rate of 800 l/h, referred to the electrochemical cell 3. The latter had an electrode area of 25 $cm^2$ and was operated with a current level of 30 A. This corresponded to a current density of 1.2 $A/cm^2$. The cell voltage was 3.9 V. The residence time container 11 had a capacity of 11 l, so that the average residence time was approx. 50 s. The reaction vessel 13 containing noble metal catalyst had a capacity of 12 l The active mass was a product having the trade name Lewatit, manufactured by Bayer. The mixed bed 14 fitted with ion exchangers had a capacity of 16 l.

The plant was operated in a manner such that, after a prior start-up phase, 100% of the water flowing through the electrochemical cell 3 was fed back to the pretreatment equipment 2 via the water return line 19, while the supply of untreated water via the feed water supply 1 was prevented. The gas balance of the plant was as follows:

| At the output from the equipment | Concentration (mg/l) | | |
|---|---|---|---|
| | $O_3$ | $O_2$ | $H_2$ |
| Cell (3) | 2.2 | 9.4 | 0 |
| Residence time container (11) | 1.6 | 9.8 | 1.43 |
| Catalytic reaction vessel (13) | 0 | 0.02 | 0 |

The invention is not restricted to the exemplary embodiments.

The requirement for maintaining a particular minimum residence time after charging the water with ozone (after passing through the electrochemical cell 3) is not tied to the presence of a residence time container 11 intended specifically for this purpose. If only small amounts of water are circulating, or on the other hand, long pipe lines are required, the residence time container 11 may turn out to be comparatively small or may be omitted completely, in particular, with sufficiently high turbulence in the circulation system.

In addition, it is not always necessary to pass the entire quantity of water treated in the pretreatment equipment 2 through the electrochemical cell 3. A part which depends on the requirements may be tapped off downstream of the pretreatment equipment 2 and supplied directly to the residence time container 11: by-pass (not drawn in in the Figure !). On the other hand, a part of the $O_2$ or $O_3$ (any excess which occurs), which is dissolved and/or present as bubbles, may be drawn off from the water after the outlet from the electrochemical cell 3, and fed via the valve 9 to equipment 10 for converting $O_3$ into $O_2$. However, additional supply of extraneous hydrogen 20 (drawn as a broken line) may also be provided at the inlet to the reaction vessel (13) containing catalyst for breaking down $O_2$ and $O_3$. The two last mentioned measures produce the same final effect: prevention of any oxygen content in elementary form in the final high-purity water for the receiver 17. The residence time container 11 and the reaction vessel 12 for ultraviolet irradiation may be combined in one and the same common vessel, so that the ozone is brought into contact with the substances and/or microbes contained in the water simultaneously with and at the same place as, the ultraviolet irradiation.

In principle, the process can be carried out with ultraviolet radiation alone or with $O_2$ and $O_3$ breakdown by means of $H_2$ alone or using both process steps simultaneously. The reaction vessels 12 and 13 have therefore been placed between vertical broken lines in the figure.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A process for purifying water, comprising the steps of:
   (i) electrolizing water in an electrochemical cell provided with a solid electrolyte, an anode space and a cathode space, to form ozone in said anode space and hydrogen in said cathode space;
   (ii) contacting said water with said ozone for a sufficient time to break down any organic substances and microbes in said water to obtain an ozone treated water;
   (iii) exposing said ozone treated water to ultraviolet radiation to obtain ultraviolet radiation treated water; and
   (iv) contacting said ultraviolet radiation treated water with a portion of said hydrogen generated in said cathode space to obtain hydrogen treated water.

2. The process of claim 1, wherein in step (iv) said ultraviolet radiation treated water is contacted with an amount of hydrogen which is not generated in said cathode space.

3. The process of claim 1, wherein the portion of said ozone and a portion of any oxygen present in said ultraviolet radiation treated water is drawn off in the gaseous state after step (iii) and before step (iv).

4. The process of claim 1, further comprising the step of:
   (v) passing said hydrogen treated water through a mixed bed ion exchanger.

5. The process of claim 1, further comprising the step of:
   (v') filtering said hydrogen treated water through an ultrafiltration or reverse osmosis apparatus.

6. The process of claim 1, wherein a portion of said hydrogen treated water is used as said water in step (i).

7. The process of claim 1, wherein said steps (ii) and (iii) are carried out simultaneously.

8. A process for purifying water, comprising the steps of:
   (i) electrolizing water in an electrochemical cell provided with a solid elecrolyte, an anode space and a cathode space, to form ozone in said anode space and hydrogen in said cathode space;
   (ii) contacting said water with said ozone for sufficient time to break down any organic substances and microbes in said water to obtain an ozone treated water; and
   (iii) contacting said ozone treated water with a portion of said hydrogen generated in said cathode space.

9. The process of claim 8, wherein in step (iii) said ozone treated water is contacted with an amount of hydrogen which is not generated in said cathode space.

10. The process of claim 8, wherein a portion of said ozone and a portion of any oxygen present in said ozone treated water is drawn off in the gaseous state after step (iii).

11. The process of claim 8, further comprising the step of:
   (iv) passing said hydrogen treated water through a mixed bed ion exchanger.

12. The process of claim 8, further comprising the step of:
   (iv') filtering said hydrogen treated water through an ultrafiltration or reverse osmosis apparatus.

13. The process of claim 8, wherein a portion of said hydrogen treated water is used as said water in step (i).

14. The process of claim 8, wherein in said step (ii) said water is mixed with an amount of unelectrolyzed water.

* * * * *